United States Patent [19]

Nishimura et al.

[11] Patent Number: 4,796,981

[45] Date of Patent: Jan. 10, 1989

[54] OPTICAL ELEMENT FOR MODULATION OF LIGHT BY HEATING A MONOMOLECULAR FILM

[75] Inventors: Yukuo Nishimura, Sagamihara; Masahiro Haruta, Funabashi; Yutaka Hirai; Kunihiro Sakai, both of Tokyo; Hiroshi Matsuda, Yokohama, all of Japan

[73] Assignee: Canon Kabushiki Kaisha, Tokyo, Japan

[21] Appl. No.: 674,602

[22] Filed: Nov. 26, 1984

[30] Foreign Application Priority Data

| Nov. 26, 1983 | [JP] | Japan | 58-221431 |
| Nov. 26, 1983 | [JP] | Japan | 58-221432 |
| Nov. 26, 1983 | [JP] | Japan | 58-221433 |
| Nov. 26, 1983 | [JP] | Japan | 58-221434 |
| Dec. 13, 1983 | [JP] | Japan | 233656 |
| Dec. 14, 1983 | [JP] | Japan | 58-234352 |
| Dec. 15, 1983 | [JP] | Japan | 58-234951 |

[51] Int. Cl.$^4$ .............................................. G02F 1/01
[52] U.S. Cl. .................................. 350/353; 252/582; 252/583; 350/355
[58] Field of Search ............ 350/350 R, 351, 353–354, 350/355; 252/582, 583

[56] References Cited

U.S. PATENT DOCUMENTS

| 3,840,695 | 10/1974 | Fischer | 350/408 |
| 3,910,682 | 10/1975 | Arai et al. | 252/299.2 |
| 3,936,815 | 2/1976 | Kogure et al. | 350/346 |
| 4,389,096 | 6/1983 | Hori et al. | 350/336 |
| 4,431,263 | 2/1984 | Garito | 350/96.34 |
| 4,439,514 | 3/1984 | Garito | 430/272 |
| 4,480,899 | 11/1984 | Sprague | 350/356 |
| 4,497,544 | 2/1985 | Mitchell et al. | 350/353 |
| 4,531,809 | 7/1985 | Carter et al. | 350/320 |
| 4,536,450 | 8/1985 | Garito | 428/411.1 |

OTHER PUBLICATIONS

Koyama, M. H., "Thermo-Optic Effect in LinPO$_3$ for Light Deflection & Switching", Electronics Letts. 10-29-81, pp. 842–844.

Reintjes, J. F. "Nonlinear Optical Parametric Processes in Liquids & Gases", Academic Press, 1984, pp. 329–331.

Pitt et al., "Lightguiding in Langmuir-Blodgett Films" Thin Solid Films, vol. 68, 5-1980, pp. 101–126.

Sauteret et al., "Optical Nonlinearities of Polymerized Diacetlenes" Optics Communications, 7-1976, pp. 55–56.

Fukui et al., "Temperature Dependence of the Thickness of Langmuir Multilayer Assembly Films" Phys. Review B, 11-1980, pp. 4898–4899.

Primary Examiner—John K. Corbin
Assistant Examiner—Martin Lerner
Attorney, Agent, or Firm—Fitzpatrick, Cella, Harper & Scinto

[57] ABSTRACT

Optical modulation is effected by heating a monomolecular film or a built-up film of monomolecular layers.

13 Claims, 1 Drawing Sheet

FIG. 4(A)　　FIG. 4(B)
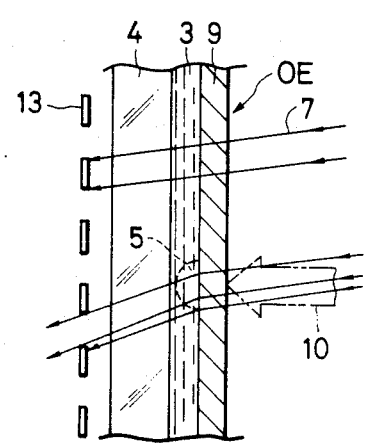
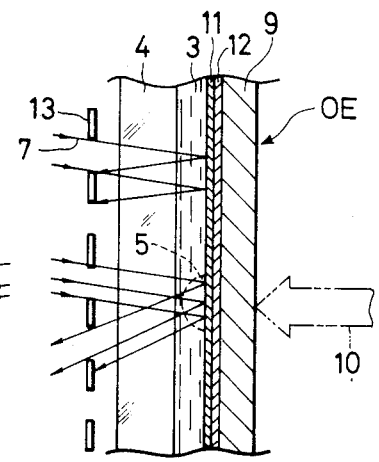
FIG. 5
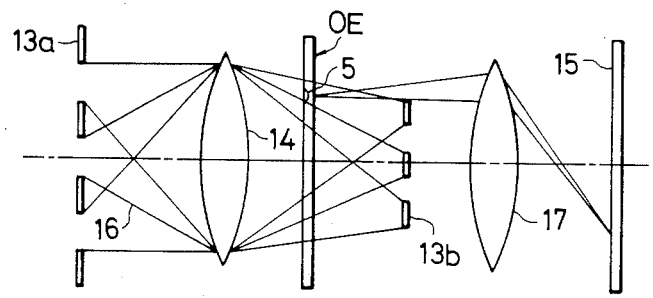
FIG. 6
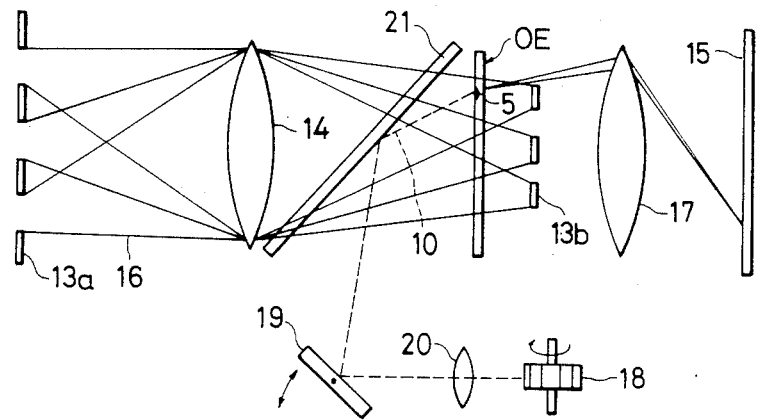

OPTICAL ELEMENT FOR MODULATION OF LIGHT BY HEATING A MONOMOLECULAR FILM

BACKGROUND OF THE INVENTION

1. Field of the Invention

This invention relates to a novel optical element, an optical modulating device and an optical modulating method.

2. Description of the Prior Art

At present, cathode ray tubes (so called CRT) have been widely utilized for terminal display devices in various kinds of instruments for offices and instruments for measurements or display devices in televisions or monitoring for video cameras. However, this CRT, remains unsatisfactory in that it has not yet reached the level to the extent of a hard copy by use of silver salt or electrophotographic method in respect to image quality, resolution and displaying capacity. Also, as a substitute for CRT, attempts have been made to utilize practically a dot matrix display with liquid crystal, namely the so called liquid crystal panel. Again, such a liquid crystal panel has failed to give satisfactory results with respect to drivability, reliability, productivity and durability.

Liquid crystal has been also utilized for optical switching element, but it is generally slow in response speed. Improvement of this drawback is possible only by choice of a limited species of liquid crystal. Yet such a limited species is poor in availability for general purpose, because of the problem inherent in liquid crystal itself that the temperature employed is limited. Under the present situation, no optical element and optical modulating device which overcome the above problem has yet been obtained.

SUMMARY OF THE INVENTION

It is an object of the present invention to solve the task which could not be solved in the prior art in such a technical field.

In short, an object of the present invention is to provide an optical element and an optical modulating method to be utilized for optical modulating devices, display devices capable of displaying images of good quality at high resolution which are excellent in drivability, productivity, durability and reliability, recording devices, memory devices, etc.

Further, another object of the present invention is to provide a novel optical modulating device by use of the optical element and the optical modulating method.

According to the present invention, there is provided an optical element comprising a monomolecular film or a built-up film of monomolecular layers comprising an organic compound molecule having at least hydrophobic moiety and hydrophilic moiety and a heat-generating element for heating said monomolecular film or said built-up film of monomolecular layers.

BRIEF DESCRIPTION OF THE DRAWINGS

FIG. 4 shows a diagram for illustration of the principle for image formation in the optical element utilizing the optical modulating method according to the present invention, FIG. 4(A) showing the case of a transmission type optical element and FIG. 4(B) showing the case of a reflection type optical element;

FIG. 5 and FIG. 6 are schematic illustrations of the structure of the light valve projector in which the optical element utilizing the optical modulating method according to the present invention is assembled;

DETAILED DESCRIPTION OF THE PREFERRED EMBODIMENTS

Figure 1A:
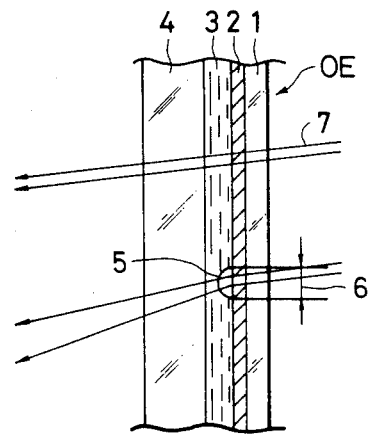
FIG. 1(A) shows a sectional view of a transmission type optical element utilizing the optical modulating method according to the present invention.

The method for preparing the optical element according to the present invention is a method for preparing an optical element comprising a monomolecular film or a monomolecular layer built-up film comprising an organic compound molecule having at least hydrophobic moiety and hydrophilic moiety and a heat generating element for heating said monomolecular film or said monomolecular layer built-up film, which comprises preparing said monomolecular film or said monomolecular layer built-up film according to the Langmuir-Blodgett method.

Referring now to the drawings, the embodiments of the optical element of the present invention prepared according to the above method are to be described. FIG. 1 are sectional views of optical elements, FIG. 1 (A) showing a transmission type optical element OE and FIG. 1(B) showing a reflection type optical element OE, respectively. In these FIGS., 1 is a substrate, 2 a heat-generating element, 3 a monomolecular film or a monomolecular layer built-up film and 4 a substrate for protection.

Figure 1B:
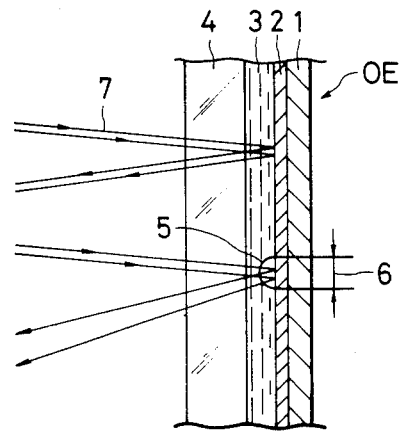
FIG. 1(B) shows a sectional view of a reflection type optical element utilizing the optical modulating method according to the present invention.

The image forming principle in the transmission type optical element shown in FIG. 1(A) is as follows.

For image formation, the heat generating element 2 is heated at a desired portion following a prescribed pattern, and physical properties are caused to be changed at the heated portion 5 of the monomolecular film or the monomolecular layer built-up film 3 on the heated heat generating element 2. When light 7 which is parallel light is permitted to be incident on the optical element from the substrate side, change in optical path or scattering occurs between the light passing through the portions other than the heated portion 5 and light passing through the heated portion 5. Such a change is caught directly or indirectly to be displayed.

In the reflection type optical element in FIG. 1(B), the light 7 is permitted to be incident on the side of the substrate for protection 4, as opposite to the case of the transmission type, and the light is reflected against the reflection film (not shown) provided nearer to the substrate 1 side than the monomolecular film or the monomolecular layer built-up film 3, and the change in optical path of the reflected light between the heated portion 5 and the portions other than the heated portion 5 is caught to be displayed.

As the constituent molecules for the monomolecular film or the monomolecular layer built-up film in the optical element of the present invention, organic compounds having hydrophobic moiety and hydrophilic moiety in the molecule can widely be utilized.

Examples of such organic compounds are shown below:

(1) Higher fatty acids $CH_3(CH_2)_{14}COOH$
$CH_3(CH_2)_{16}COOH$
$CH_3(CH_2)_{18}COOH$
$CH_3(CH_2)_4(CH{=}CHCH_2)_4(CH_2)_2COOH$
$CH_2{=}CH(CH_2)_8COOH$
$CH_2{=}CH(CH_2)_{15}COOH$
$CH_2{=}CH(CH_2)_{20}COOH$ $CH_3(CH_2)_{17}\underset{\underset{CH_2}{\|}}{C}COOH$ $CH_3(CH_2)_8C{\equiv}C{-}C{\equiv}C(CH_2)_8COOH$
$CH_3(CH_2)_9C{\equiv}C{-}C{\equiv}C(CH_2)_8COOH$
$CH_3(CH_2)_{11}C{\equiv}C{-}C{\equiv}C(CH_2)_8COOH$
$CH_3(CH_2)_{13}C{\equiv}C{-}C{\equiv}C(CH_2)_8COOH$ (2) Cyanine dyes Cyanine dyes represented by the general formula I:

$$X{-}(CH{=}CH)_n X' \quad (I)$$

wherein X is a group of the formula II or III, X' is a group of the formulae IV-X, and n is 0 or a positive integer.

(II)

(III)

(IV)

(V)

(VI)

(VII)

(VIII)

(IX)

(X)

In the above formulae II to X, Z is N—$R_1$, O, Se or C(e)$_2$, Y is H or 2-Me, $R_1$ is a $C_1$–$C_4$ alkyl and $R_2$ is a $C_{10}$–$C_{30}$ alkyl.

Typical examples of the cyanine dyes represented by the formula I are set forth below:

-continued

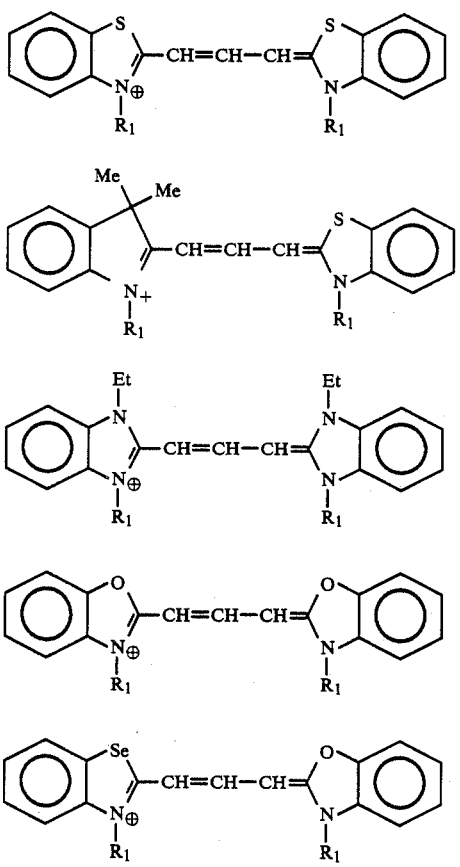

(3) Azo dyes

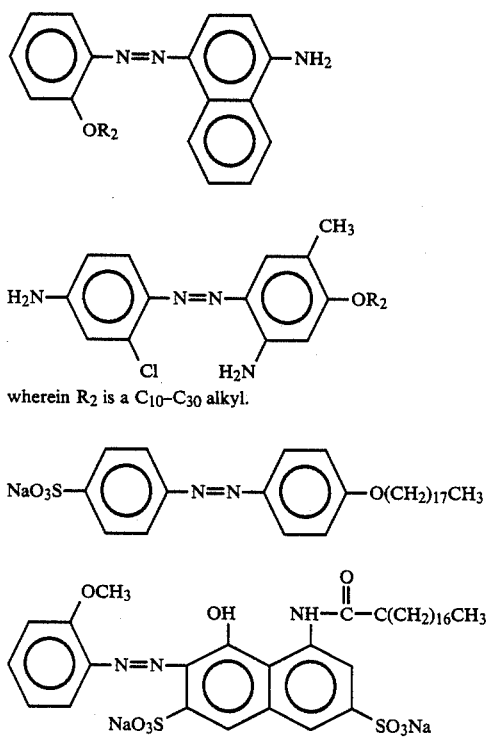

wherein R₂ is a C₁₀–C₃₀ alkyl.

(4) Phospholipids Lecithin, Sphingomyelin, Plasmalogen, Cephalin (5) Long chain dialkylammonium salts

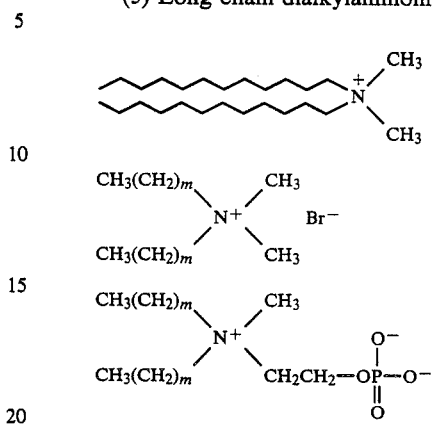

wherein m is an integer of 10 to 30.

The monomolecular film or the monomolecular layer built-up film can be prepared by use of the above organic compounds according to, for example, the Langmuir-Blodgett method (LB method) developed by I. Langmuir et al. The method is a method in which a monomolecular film or a monomolecular layer built-up film is prepared by utilizing the phenomenon in a molecule having hydrophilic group and a hydrophobic group in the molecule that the molecule is formed into a layer on the water surface with the hydrophilic group pending downward when a moderate balance (balance of amphipatic property) is maintained between both groups, The monomolecular layer on the water surface has the specific feature of a two dimensional system. When the molecules are scattered sparsely, the following equation of two dimensional ideal gas is valid between the surface area A per one molecule and the surface pressure $\pi$, thus forming "gas film":

$$\pi A = kT$$

wherein k is the Boltzman constant and T is absolute temperature.

If A is made sufficiently small, the interactions between molecules are strengthened to form "condensed (or solid) film" of two dimensional solid. The condensed film can be transferred in a layer one by one onto the surface of a substrate such as glass. By use of this method, the monomolecular film or the monomolecular layer built-up film can be produced according to, for example, the procedure as described below.

First, an organic compound is dissolved in a solvent, and the resultant solution is developed into an aqueous phase to form a film of the organic compound. Next, the gathered state of the film substance is controlled through restriction of its development area by providing a partition wall (or a buoy) so that the film substance may not be expanded too much by free diffusion on the aqueous phase, to obtain a surface pressure $\pi$ in proportion to the gathered state. By moving this partition wall, the development area can be reduced to control the gathered state of the film substance, whereby the surface pressure can be increased gradually to set a surface pressure suitable for production of the built-up film. While maintaining this surface pressure, a clean substrate can be moved vertically therethrough to have the monomolecular film transferred thereon. A monomolecular film can be produced as described above, and a built-up film of monomolecular layers can be formed by repeating the above procedure to a desired degree of accumulation.

The film forming molecules may be at least one selected from the organic compounds as described above.

The monomolecular film or the built-up film of monomolecular layers may have a thickness suitably within the range from 30 Å to 300 μm, particularly from 3000 Å to 30 μm.

Figure 2:
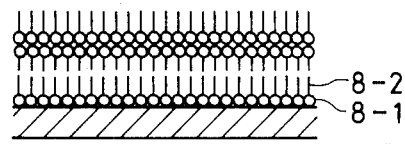
FIG. 2 shows a schematic illustration of the monomolecular layer built-up film.

For transfer of the monomolecular film onto a substrate, in addition to the vertical dipping method as mentioned above, it is also possible to employ a method such as the horizontal attachment method, the rotary cylinder method, etc. According to the horizontal method, the substrate is brought into contact with the water surface horizontally for transfer of the monomolecular layer, while the monomolecular layer is transferred according to the rotary cylinder method by rotating a cylindrically shaped substrate on the water surface. According to the vertical dipping method as mentioned above, when a substrate is drawn up across the water surface, a monomolecular layer with the hydrophilic groups facing toward the substrate side is formed for the first layer on the substrate. When the substrate is moved up and down as described above, monomolecular layers are built-up one by one with the progress of respective steps. Since the orientation of the film forming molecules in the withdrawing step is opposite to that in the dipping step, a Y-type film, in which hydrophilic groups come face to face with hydrophilic groups or hydrophobic groups with hydrophobic groups between layers, is formed according to this method. A schematic illustration of the monomolecular layer built-up film is shown in FIG. 2, wherein 8-1 represent hydrophilic groups and 8-2 hydrophobic groups.

In contrast, according to the horizontal attachment method, transfer is effected by bringing the substrate into contact with the water surface horizontally, whereby the monomolecular layer is formed with the hydrophobic groups faced toward the substrate side. According to this method, even when built-up, there is no alteration in orientation of the film forming molecules, but a X-type film with the hydrophobic groups faced toward the substrate side are formed in all the layers. On the contrary, built-up-up film with the hydrophilic groups faced toward the substrate side in all the layers is called the Z-type film.

The rotary cylinder method is a method, in which the monomolecular layers are transferred by rotating a cylindrical substrate on the water surface. The method for transferring the monomolecular layers onto the substrate surface is not limited to these methods, and it is also possible to apply a method in which a substrate is extruded into the aqueous phase from a substrate roll, when employing a substrate with a large area. Also, the orientation of the hydrophilic groups or the hydrophobic groups toward the substrate as described above is no more than the general principle, and it can be changed by surface treatment of the substrate or other modification.

Other methods for preparation of monomolecular films or monomolecular layer built-up films may include the sputtering method, the plasma polymerization method, the bimolecular film preparation method, etc.

The materials available for the substrate 1 may include glasses, metals such as aluminum, plastics and ceramics. In the case of the transmission type as shown in FIG. 1(A), the material should preferably be a light-transmissive glass or plastic having pressure resistance as high as possible, particularly a colorless or pale-colored material. When the substrate surface is washed insufficiently, the monomolecular film will be disturbed when transferred from the water surface to give poor monomolecular film or monomolecular layer built-up film, and therefore the substrate to be employed should have a clean surface.

The substrate for protection 4 should suitably be a light-transmissive glass or plastic having pressure resistance as high as possible, particularly preferably a colorless to pale-colored material. Although provision of the substrate for protection 4 is preferred for improvement of durability and stability of the monomolecular film or the monomolecular layer built-up film, no substrate for protection 4 is necessary depending on the choice of the film forming molecules.

The heat-generating element 2 is provided for the purpose of heating the monomolecular film or the monomolecular layer built-up film through thermal conduction by heat generation in various forms such as dot-matrix, dot-line, line, island, etc.

For the heat-generating element 2, those utilizing radiant ray heating by IR-ray or those utilizing Joule heat such as resistance heating may be employed. The former includes various inorganic or organic materials, for example, inorganic pigments such as alloys of Gd-TbFe, carbon black, etc., organic dyes such as nigrosine, etc. and organic pigments such as azo-type pigments are suitable ones. The latter includes, for example, metal compounds such as hafnium boride, tantalum nitride, etc. and alloys such as of nickel-chromium, etc. The film thickness of the heat-generating element 2 affects energy transfer efficiency and resolution. From these standpoints, the heat-generating element 2 should preferably have a thickness of 1000 to 2000 Å. In the case of a transmission type optical element, the heat-generating element 2 is required to be transmissive to visible light. However, without specially providing the heat-generating element 2, by choice of the substrate material having the above characteristics, the substrate 1 can also function as the heat-generating element.

As the reflection film, a metal film or a dielectric mirror is provided with the use of a high melting metal material or metal compound on the side nearer to the substrate 1 than the monomolecular film or the monomolecular layer built-up film 3 according to the sputtering method or the vapor deposition method. The reflection film, similarly as the heat-generating element 2, can also be merged into the substrate 1 by choice of a material capable of reflection of light for the material of the substrate 1.

The monomolecular film or the monomolecular layer built-up film on the substrate is fixed sufficiently firmly, and it will scarcely be peeled or peeled off from the substrate, but it is also possible to provide an adhesive layer between the substrate and the monomolecular film or the monomolecular layer built-up film for the purpose of reinforcement. Further, the adhesive force can also be strengthened by choice of the monomolecular layer forming conditions, the hydrogen ion concentration or the ion species in the aqueous phase or the surface pressure, for example, in the case of LB method.

The change in physical properties at the heated portion 5 as previously mentioned refers particularly to the change in optical physical properties, more specifically, refractive index, density, polarizability, etc. and phase transition of the mass of molecules constituting the monomolecular film or the monomolecular layer built-up film. For example, to describe refractive index among these, suppose now that through heat generation of the heated portion 6 of the heat-generating element 2, the monomolecular film or the monomolecular layer built-up film 3 is elevated in temperature from the temperature t ° C to (t +Δt) ° C. In this case, the refractive index of the monomolecular film or the monomolecular layer built-up film at t ° C is defined as N, and that at (t +Δt) ° C as N +ΔN, then the refractive index gradient is $\Delta N/\Delta t \approx 10^4$ (1/° C.) Although the change in refractive index, namely the refractive index change relative to temperature, is small, the refractive index gradient in the minute region is great when a minute region of the monomolecular film or the monomolecular layer built-up film 3 near the heated portion 6 of the heat-generating element 2 is heated. Accordingly, heated portion 5 of the monomolecular film or the monomolecular layer built-up film 3 has a high power at the minute region, whereby the light will be refracted, scattered and diffracted at the region with greater refractive index gradient.

Through heat generation at the heated portion 6 of the heat-generating element 2, the monomolecular film or the monomolecular layer built-up film 3 is heated to the extent so as to be changed in physical properties a described above to form the heated portion 5. Other sites of the heat-generating element 2 are without heat generation, and there is no change in physical properties of the monomolecular film or the monomolecular layer built-up film at lower temperature regions corresponding thereto, but the physical properties are approximately uniform. Although there may be practical changes in optical properties due to thermal conduction from the heated portion, they are negligible as compared with those at the heated portion.

The light 7 passing through the heated portion 5 of the monomolecular film or the monomolecular layer built-up film 3 does not proceed straightforward through the monomolecular film or the monomolecular layer built-up film 3 but is refracted to be changed in its optical path, scattering, diffraction, etc. by the gradient index thermally formed at this portion. This is why the light 7 passing through the heated portion 5 of the monomolecular film or the monomolecular layer built-up film and the light 7 not passing therethrough do not become parallel lights but they are different from each other in directions when emitted from the optical element OE. Hence, the light passing through the higher temperature region of the heated portion 5 of the monomolecular film or the monomolecular layer built-up film 3 can be distinguished optically from the light passing through the lower temperature region of the monomolecular film or the monomolecular layer built-up film 3 at the sites other than the heated portion.

Figure 3A:
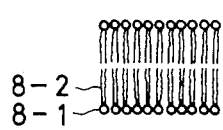
FIG. 3 shows a schematic illustration of the phase transition phenomenon in the monomolecular layer built-up film.
Figure 3B:
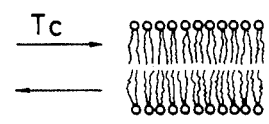

The above-mentioned phase transition is caused by the changes in temperature, pressure, etc. The temperature at which phase transition is caused, namely the phase transition temperature (Tc) is inherent in each substance, and the organic compound for forming the monomolecular film or the monomolecular layer built-up film should preferably be in the crystalline phase at Tc or lower, and transitioned to liquid crystal phase at higher than Tc. Tc ay preferably be 50 to 100° C. For example, a dialkylammonium salt has a Tc of 20° C. to 60° C. Generally speaking, Tc is higher as the alkyl chain length is longer. FIG. 3 shows schematically the phase transition phenomenon in the case of dialkylammonium salts. As described above, the refractive index change is approximately in proportion to the temperature change, and it is changed markedly around Tc. Therefore, it is ore preferable to set the heating temperature at higher than Tc. Of course, it is not required to set the temperature at higher than Tc, if sufficient refractive index change can be obtained at temperatures of Tc or lower. Further, by choosing appropriately the constituent molecules for the built-up film, light scattering or light intransmission can be exhibited through phase transition from a certain kind of liquid crystal phase to a certain kind of liquid crystal. Such changes in other physical properties than refractive index through phase transition such as light scattering ay also be available to image formation.

The optical element of the present invention can give also a display for direct observation under certain irradiating conditions (e.g. irradiation by parallel light), but its use and value-in-use can be further broadened as the display device by combination with the image forming optical system as hereinafter described. In the case of direct display by a transmission type optical element, the display image elements an be distinguished on the basis of difference in doses of light reaching the observation eyes (not shown) located against the direction of the light passed through the heating portion 5 of the monomolecular film or the monomolecular layer built-up film. The direct observation display can be more simple and effective by utilization of the light scattering through phase transition.

In the case of a combination of the reflection type optical element and the image forming optical system as hereinafter described, due to the difference in image forming position by the image forming optical system for the heated portion of the monomolecular film or the monomolecular layer built-up film and by the image forming optical system for the portion of lower, temperature (hereinafter called as non-heated portion) which is not heated with the heating element 2 (inclusive of the case when the monomolecular film or the monomolecular layer built-up film is pre-heated with the heat-generating element), discrimination between the display points can more clearly be affected by defocusing. Thus, defocusing may be utilized for reversal display from light points to dark points. When employing no image forming optical system as hereinafter described, the display effect can be improved dramatically by use of parallel light as the irradiating light for the purpose of increasing the display effect of the optical element and by employment of a light shielding lattice as hereinafter described. In FIG. 1, the heat generating element 2 is shown to heat the monomolecular film or the monomolecular layer built-up film 3 in direct contact therewith, but the monomolecular film or the monomolecular layer built-up film ay also be heated through thermal conduction by arrangement of the heat-generating element 2 in the vicinity of the monomolecular film or the monomolecular layer built-up film, For example, when the heat-generating element 2 does not reflect light in FIG. 1(B), a metal film or dielectric mirror, etc. may be interposed between the monomolecular film or the monomolecular layer built-up film 3 and the heat-generating element 2.

In FIG. 1, for better understanding of explanation, the light flux incident upon the optical element OE is made parallel light. However, parallel light is not limitative of the invention, but it will essentially be sufficient if the light incident on the optical element OE can undergo change in optical path as compared with the optical path before formation of the heated portion 5 by formation of the higher temperature region of the monomolecular film or the monomolecular layer built-up film 3 in the optical path through heat generation of the heated portion 6 of the heat-generating element.

FIG. 4 shows sectional views for illustrating in more detail the image forming principle of the optical element utilizing the optical modulating method of the present invention, FIG. 4(A) showing the transmission type optical element and FIG. 4(B) the reflection type optical element, respectively.

Figure 11:
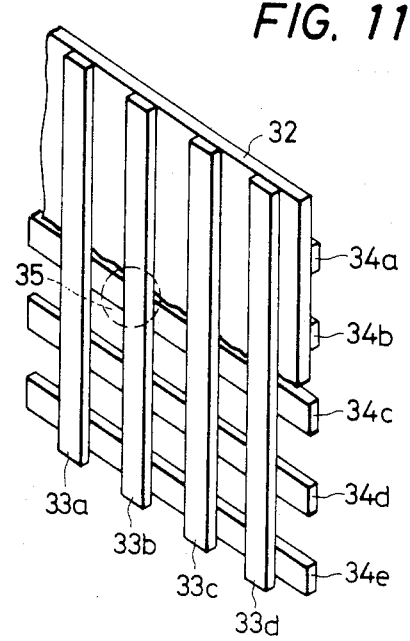
FIG. 11 and FIG. 12 show perspective views of the outer portions for illustration of the heat generating elements.

In this FIG. 9 represents a radiation absorbing layer which absorbs the radiation 10 and generates heat, 3 the monomolecular film or the monomolecular layer built-up film and 4 the substrate for protection. In the reflection type optical element OE shown in FIG. 4(B), 11 represents reflection film for reflecting the light 7 to be utilized for display, and 12 a heat-generating layer for heating previously the monomolecular film or the monomolecular layer built-up film 3. These reflection film 11 and heat-generating layer 12 are not essentially required for the optical element OE, but they can optionally be provided, if necessary. For example, when the radiation absorbing layer 9 has light reflectivity, no reflection film 11 will be employed. Also, no heat-generating layer 12 is necessary, when the radiation intensity is sufficiently strong. However, with reference to FIG. 4(B), explanation is made by disregarding the heat-generating layer 12, since the heat-generating layer 12 is described hereinafter. If desired, the heat-generating layer 12 may also be provided in the transmission type optical element as shown in FIG. 4(A). The radiation absorbing layer 9 can generate heat efficiently by absorption of radiation 10, particularly IR-ray, but it must be made of a material which can hardly be molten through heat generation. The radiation absorbing layer 9 can be obtained by film formation (including multi-layer film) of various inorganic or organic material. Since the radiation absorbing layer 9, having a film thickness of about several microns, is itself poor in supporting function, it is generally practiced to add a radiation-transmissive support made of a glass or plastic not shown as the substrate thereto. The organic compound constituting the monomolecular film or the monomolecular layer built-up film 3, which is inclusive of various kinds of compounds as mentioned above, may generally be desired to have light-transmittance to visible light, but there is no problem if it has transmittance to the radiation 10 such as IR-ray or not. 13 represents a lattice, which shields the light 7 incident on the optical element and transmitted through the transmission type optical element or the light 7 reflected from the reflection type optical element when the monomolecular film or the monomolecular layer built-up film 3 is not heated. When a radiation (particularly IR-ray) 10 is irradiated on the thus constituted optical element OE from the right of the drawing, heat-generation occurs at the corresponding point of the radiation absorbing layer 9. By heat-generation at a part of the radiation absorbing layer 9, the monomolecular film or the monomolecular layer built-up film at the portion in contact therewith or in the vicinity thereof will be heated through thermal conduction to be elevated in temperature, whereby its physical properties will be changed from those before heating to form a heated portion 5 of higher temperature region of the monomolecular film or the monomolecular layer built-up film 3. The light 7 passing through the heated portion 5 is changed in its optical path when passing through the heated portion 5 according to the mechanism as described in FIG. 1. At least a part of the light 7 subjected to such an optical path change passes through the opening of the lattice 13, when exiting from the optical element OE. On the other hand, the light 7 not passing through the heated portion 5 is shielded all by the lattice 13, whereby the light 7 passing through the monomolecular film or the monomolecular layer built-up film 3 having the heated portion 5 formed thereon and the light 7 passing through the non-heated portion can be discriminated from each other when the optical element OE is viewed through the lattice 13.

Of course, if the light 7 passing through the non-heated portion is made to pass through the openings of the lattice 13, when the heated portion 5 is formed, the light passing through this portion will be shielded by the lattice 13 to give openings through which the light 7 does not pass, whereby an optical element in the form opposite to the above example can also be rendered possible.

Even in absence of the lattice 13, the direction of the light 7 passing through the heated portion 5 of the monomolecular film or the monomolecular layer built-up film 3 and the direction of the light 7 passing through the non-heated portion are different from each other, when exiting from the optical element OE, and therefore the light 7 can be optically discriminated, when viewed against the direction of either one of the light fluxes.

When the optical element OE is to be irradiated with the radiation 10, it can be irradiated in a pattern so as to correspond to a desired image, or the radiation 10 can be irradiated as a number of beams collectively in dots by utilizing a laser light source, and it is also possible to scan one beam or one line beam on the radiation absorbing layer 9.

The direction in which the radiation 10 is irradiated is not limited to the embodiment shown in the Figure in the case of the transmission type optical element OE a shown in FIG. 4(A). In other words, it is also possible to irradiate the radiation from the left of the drawing, in the case when the radiation 10 transmits through the protective substrate 4 and the monomolecular film or the monomolecular layer built-up film 3. Extinction of display can be effected spontaneously with cooling of the heated portion 5 of the monomolecular film or the monomolecular layer built-up film.

In the above description, explanation has been made about the method of forming a display image by heating with radiation, but it is also possible to modify the mode of the present invention such that the radiation absorbing layer 9 is replaced with a heat transfer layer such as of a metal not shown as hereinafter described, which is brought close to or in contact with a heat-generating element not shown, thereby heating the monomolecular film or the monomolecular layer built-up film through thermal conduction.

In the present invention, for further enhancing the discriminating effect of the display image elements, a reflection film 11 against visible light as mentioned above can also be interposed between the radiation absorbing layer 9 and the monomolecular film or the monomolecular layer built-up film. Such a reflection film 11 is required to be formed of a metal material or a metal compound material which has a high melting point and will not itself be molten during thermal conduction.

For obtaining an effective display in the optical element of the present invention, the interface at which the monomolecular film or the monomolecular layer built-up film contacts the radiation absorbing layer 9 and its vicinity are required to be heated, but it is not necessarily required that the heating should extend to the interface at which the monomolecular film or the monomolecular layer built-up film contacts the protective substrate 4 and its vicinity. However, it has been found as the result of experiments that the contrast of the display of the optical element OE can be improved more, the higher is the temperature at the interface of the monomolecular film or the monomolecular layer built-up film contacting the heated surface of the radiation layer 9 or its vicinity than the temperature of the monomolecular film or the monomolecular layer built-up film at the peripheral region. Further, by utilizing this positively, display of an intermediate tone is rendered possible by making the heat content for heating the monomolecular film or the monomolecular layer built-up film 3 different.

The contrast of the display can be better, as the size of spot irradiated by the radiation 10 on the radiation absorbing layer 9 is smaller, and the spot size (diameter) of the radiation 10 should suitably be about 0.5 $\mu$ to 100 $\mu$.

However, a display image can be obtained even when the radiation absorbing layer 9 may be irradiated with the radiation 10 with a rectangular light flux of 2 mm in width and 10 mm in length. The heated portion 5 of the monomolecular film or the monomolecular layer built-up film as frequently employed in explanation of the principle of the present invention is also inclusive of the latter scope. In this regard, even if the heated portion 5 of the monomolecular film or the monomolecular layer built-up film is not minute, the discriminating effect can be obtained only if there is created a difference between the direction of the optical path of the light at the heated portion and the direction of the optical path of the light at the non-heated portion. Thus, in the present invention, the heated portion 5 of the monomolecular film or the monomolecular layer built-up film is not limited to the minute range.

In the optical element of the present invention, as shown in FIG. 4(B), it may sometimes be desirable for accelerating greatly the seed for formation of the heating portion of the monomolecular film or the monomolecular layer built-u film as the display image element to preheat a certain monomolecular film or monomolecular layer built-up film by provision of a heat-generating layer 12 which generates heat through Joule's heat, between the radiation absorbing layer 9 and the monomolecular film or the monomolecular layer built-up film 3 in the optical element OE when using no reflection film, or between the radiation absorbing layer 9 and the reflection film 11 when employing a reflection film. And, it is also desirable, when the radiation absorbing layer 9 or the reflection film 11 is a conductor, to provide an insulating layer not shown between these and the heat-generating layer 12.

As such a heat-generating layer 12, it is preferable to use a linear heat-generating element or a lattice-like heat-generating element (none of them being shown) corresponding substantially to one or a plurality of scanning beams of the radiation beams. When the heat-generating element 12 is a linear heat-generating element, good display results can be obtained, probably because the heat-generating portion is minute in the thickness direction thereof. It is thereby preferred to synchronize irradiation of the radiation 10 onto the radiation absorbing layer 9 with heating of the monomolecular film or the monomolecular layer built-up film 3 by the heat-generating layer 12. As the material for such a heat-generating layer 12, there may be included metal compounds as represented by hafnium boride or tantalum nitride, and alloys such as nickel-chromium, etc.

Also, in the present invention, a construction in which a corrosive constituent element contacts directly the monomolecular film or the monomolecular layer built-up film should be avoided, because such a construction will lower the life of the element. This is because, in a constitution where a corrosive constituent element contacts the monomolecular film or the monomolecular layer built-up film, chemical corrosion, thermal oxidation, etc. will occur to cause frequently damages or deterioration of the optical element.

Accordingly, in such a case, it is desirable to form an anti-corrosive protective film (not shown) at the interface between the monomolecular film or the monomolecular layer built-up film and the corrosive constituent element. As the material for such a protective film, there may be employed dielectric materials such as silicon oxide, titanium oxide, etc, and heat-resistant plastics. In some cases, the reflection film may also have the function of the protective film.

When metals are employed for the radiation absorbing layer 9, they are ordinarily formed into films on a radiation transmitting supporting plate as the substrate, and therefore there is no fear of oxidation by the external air on heating of the radiation absorbing layer 9. When absorption of the radiation by the radiation absorbing layer 9 is incomplete, a reflection prevention film (not shown) can be applied on the side on which the radiation 10 is to be irradiated to enhance markedly absorption of the radiation 10 by the radiation absorbing layer 9.

Referring next to FIG. 5 and FIG. 6, the light valve projector is to be described. The light valve is for regulating or controlling light, and therefore all the displays of the system in which the light from independent light source is controlled by an appropriate medium (in the case of the present invention, the monomolecular film or the monomolecular layer built-up film of the optical element) to effect display by projection on a screen are included within this concept. This system, as compared with the self-luminous display such as the cathode ray tube, can increase in principle the size and lightness of the display picture screen by intensifying the light source employed, and therefore it is suitable for large picture screen display for which a large quantity of light is required. The embodiment shown in FIG. 5 is called also the Schlieren light valve, by which a pattern different in refractive angle, diffractive angle or reflective angle or a pattern by scattering is formed on the monomolecular film or the monomolecular layer built-up film which is the controlling medium corresponding to the input signal, and its change is converted by the Schlieren optical system to light and dark images, which are then projected on a screen.

FIG. 5 is a schematic constitutional drawing for illustration of the basic principle of the display device. The respective slits of the first lattice 13a are arranged so that their images may be formed by the Schlieren lens 14 so as to be shielded on the respective bars of the second lattice 13b. If the monomolecular film or the monomolecular layer built-up film as the medium of a transmission type optical element OE placed between the Schlieren lens 14 and the second lattice 13b is not heated and its physical properties (e.g. refractive index) are uniform, the incident light passing through the first lattice 13a is all shielded by the second lattice 13b, and cannot reach the screen 15. However, when a part of the monomolecular film or the monomolecular layer built-up film of the optical element OE is heated with a heat-generating element to become a high temperature, thereby forming a heated portion 5 of the monomolecular film or the monomolecular layer built-up film, the light passing therethrough will be changed in optical path as described above, whereby the incident light 16 passing therethrough is not shielded by the second lattice 13b but can pass through the interstice (opening) of the second lattice 13b to reach the screen 15. Accordingly, by arranging the image forming lens 17 so that the heated surface or the medium surface in the vicinity thereof heating the heated portion 5 of the monomolecular film or the monomolecular layer built-up film may form its image on the screen 15, light and dark image corresponding to the amount of temperature change of the monomolecular film or the monomolecular layer built-up film of the optical element OE can be obtained on the screen 15. The opening of the first and the second lattices employed is not particularly limited, whether it may be a line or a dot.

FIG. 6 is a schematic illustration of a transmission type light valve projector, showing an embodiment of arrangement of signal inputting means for the transmission type optical element. 13a is a first lattice, OE is a transmission type optical element, 14 is a Schlieren lens, 13b is a second lattice, 17 is an image forming lens and 15 is a screen. These constituents are similar to those of the display device shown in FIG. 5. The signal light of the radiation 10 (primarily IR-ray) modulated through a laser light source and a light modulator (not shown) is scanned horizontally by a rotatory multi-face mirror as the horizontal scanner 18, passed through the lens 20, scanned vertically by a rotary multi-mirror or a galvanomirror as the vertical scanner 19 and reflected against a cold filter 21 to form an image on the radiation absorbing layer 9 in the transmission type optical element as shown in FIG. 4(A), which heats the monomolecular film or the monomolecular layer built-up film in a dot-matrix to form a two dimensional image of the heated portion 5 of the monomolecular film or the monomolecular layer built-up film. On the other hand, the incident light 16 passed through the first screen 13a passes through the cold filter 21 and therefore, according to the mechanism as described with reference to FIG. 5, a two-dimensional visible image corresponding to the monomolecular film or the monomolecular layer built-up film of the optical element OE can be formed on the screen 15. The radiation absorbing layer in the optical element OE to be used in this Figure should of course be transmissive of visible light.

If a semiconductor laser array or a light emitting diode array (one juxtaposed in a line) is used, the horizontal scanner can be omitted. Also, the cold filter and the galvanomirror can be used in combination.

Figure 7:
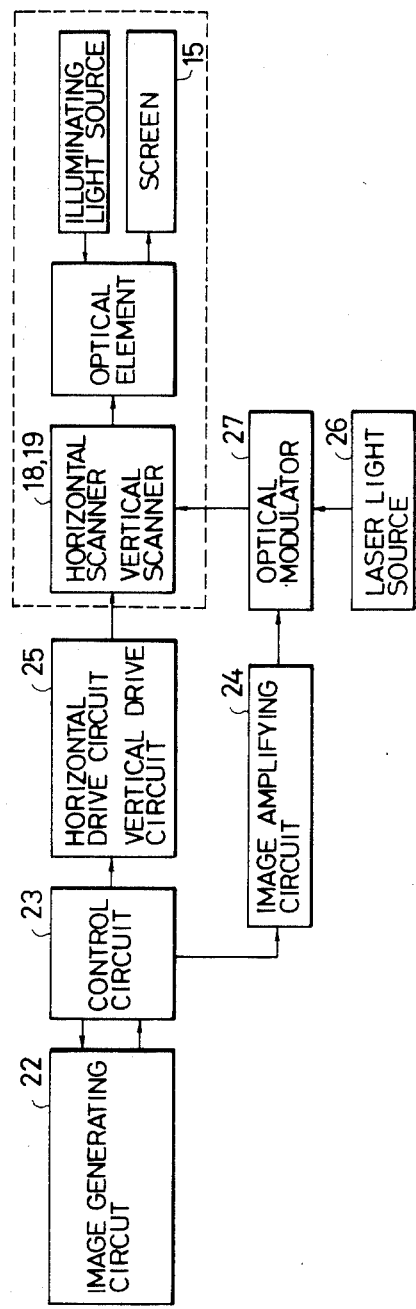
FIG. 7 shows the block diagram of the light valve projector as the display device utilizing the optical modulating method according to the present invention.

FIG. 7 is a block diagram of the light valve projector as the display device utilizing the optical modulating method according to the present invention.

22 is an image generating circuit for generating image signals, 23 is a control circuit for controlling the image signals and giving the controlled signals to the image aamplifying circuit 24 and the horizontal and vertical drive circuit 25, 26 is a laser light source, 27 is an optical modulator for modulating laser beam from the laser light source according to the signals from the image amplifying circuit 24. The light modulated by the optical modulator 27 enters the horizontal scanner 18 or the vertical scanner 19. Also, the horizontal scanner 18 and the vertical scanner 19 can be actuated by receiving the driving signals synchronized with the image signals of the horizontal and vertical drive circuits 25, respectively. Explanation of the constitution of the portion within the broken line is omitted, since it is the same as described above.

The image signals outputted from the image generating circuit 22 are amplified through the control circuit 23 in the image amplifying circuit 24. By the input of the amplified image signals, the optical modulator 27 is driven to modulate the laser beam emitted from the laser light source 26. On the other hand, horizontal synchronizing signals and vertical synchronizing signals are outputted from the control circuit 23 to drive the horizontal scanner 18 and the vertical scanner 19 through the horizontal and vertical drive circuit 25. Thus, a thermally two-dimensional image is formed in the monomolecular film or the monomolecular layer built-up film of the optical element OE. The following actuation of the constitution within the broken line is the same as described above and omitted for the purpose of brevity. When TV electromagnetic wave is to be received, a receiver may be used in place of the image generating circuit 22.

Figure 8:
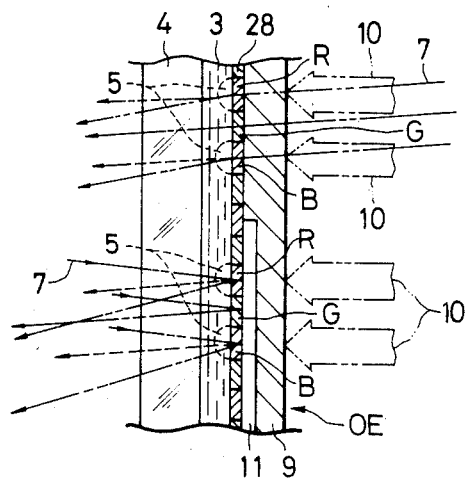
FIG. 8 shows a sectional view of a color optical element utilizing the optical modulating method according to the present invention.

FIG. 8 is an example of the color optical element utilizing the optical modulating method of the present invention. For convenience of explanation, the upper half is shown as the sectional view of a transmission type optical element, while the lower half as the sectional view of a reflection type optical element. 9 is a radiation absorbing layer, and 11 is a reflection film, which is not provided in the transmission type optical element shown in the upper half of this FIG. 28 is a color mosaic filter, and its concrete constitution and preparation techniques are described in detail in Japanese patent Publication Nos. 13094/1977 and 36019/1977, which are incorporated herein by way of reference. 3 shows a monomolecular film or the monomolecular layer built-up film, 4 a protective substrate and 28 a color mosaic filter.

In the embodiment shown in the Figure, when the monomolecular film or the monomolecular layer built-up film 3 in contact with the red filter portion (R) of the color mosaic filter 28 is heated through thermal conduction by contact with the radiation absorbing layer 9, absorbing the radiation 10, and the heated portion 5 of the monomolecular film or the monomolecular layer accumulated film is formed thereon, the parallel light 7 reflected by the reflection film 11 or transmitted through the radiation absorbing layer 9, by passing through the heated portion 5 of the monomolecular film or the monomolecular layer built-up film according to the mechanism as described above, is emitted out of the optical element OE along the crooked optical path as shown by the two-dot chain line which is different from the optical path of the light passed when there is no heated portion as shown by the broken line. When the white light enters the red filter portion (R), the transmitted light or the reflected light emitted from the optical element OE is only the light of which only red can be visualized (hereinafter called the red light). As for the lights passed through the blue filter portion (B) and the green filter portion (G), the same description as described above for the pathway of the light passing through the red filter portion (R) can be applied. However, in the case of FIG. 8, only the light line not passing through the heated portion 5 is shown for the green filter portion (G). Also, in the case when the incident light is white light, the light passed through the blue filter portion (B) is only the light of which only blue can be visualized (hereinafter called the blue light), and the light passed through the green filter portion (G) is the light of which only green can be visualized (hereinafter called the green light). When the optical element OE is viewed toward the direction of the light passing through the heated portion 5 of the monomolecular film or the monomolecular layer built-up film, the observer not shown will visualize the simulated color according to the additive color process. For example, when the heated portion 5 is formed by heating the monomolecular film or the monomolecular layer built-up film 3 at the same time in the red filter portion (R), the green filter portion (G) and the blue filter portion (B) in the adjacent color mosaic filter, the observer not shown can visualize the white color.

Also, as explained in FIG. 4, by passing only the light passed through the heated portion 5 of the monomolecular film or the monomolecular layer built-up film of the light emitted from the optical element through the opening of a light shielding lattice not shown, a still more distinct simulated color display according to the additive color process can be obtained.

Figure 9A:
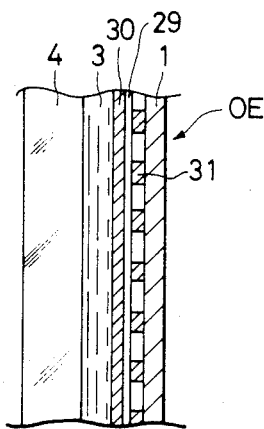
FIG. 9 shows a sectional view of an example of the constitution of a matrix driving type optical element, FIG. 9(A) showing a transmission type optical element and FIG. 9(B) a reflection type optical element.
Figure 9B:
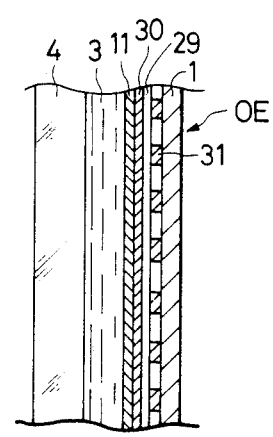

FIG. 9 is a sectional view of another optical element utilizing the optical modulating method of the present invention, FIG. 9(A) showing a transmission type optical element and FIG. 9(B) a reflection type optical element. In this FIG., 3 is the monomolecular film or the monomolecular layer built-up film, 4 is the protective substrate, and these are elements having the same functions as explained with reference to FIG. 1 and FIG. 8. 29 is thermally conductive insulating layer, and there are arranged two-dimensionally a plurality of heat-generating resistence wires 30, 31 in a matrix so as to cross each other with the insulating layer interposed therebetween. 1 is a substrate as the supporting plate for these heat-generating resistance wires 30, 31 and the insulating layer 29. In the case of the transmission type optical element OE shown in FIG. 9(A), these heat-generating resistance wires 30, 31, the substrate 1 and the insulating layer 29 are transparent, and the heat-generating resistance wires, for example, are constituted of transparent thin films of indium tin oxide. And, these display elements OE are designed so that the heated portion (not shown) of higher temperature region capable of display may be formed in the monomolecular film or the monomolecular layer built-up film 3 at the crossed region of both wires, only when the predetermined heat-generating resistance wires 30 and 31 are both selected and generate heat. The color mosaic filter may be provided at least at the crossed portion of the heat-generating wires 30 and 31. Also, the reflection film 11 may be provided, if necessary, as described with reference to FIG. 4.

Figure 10:
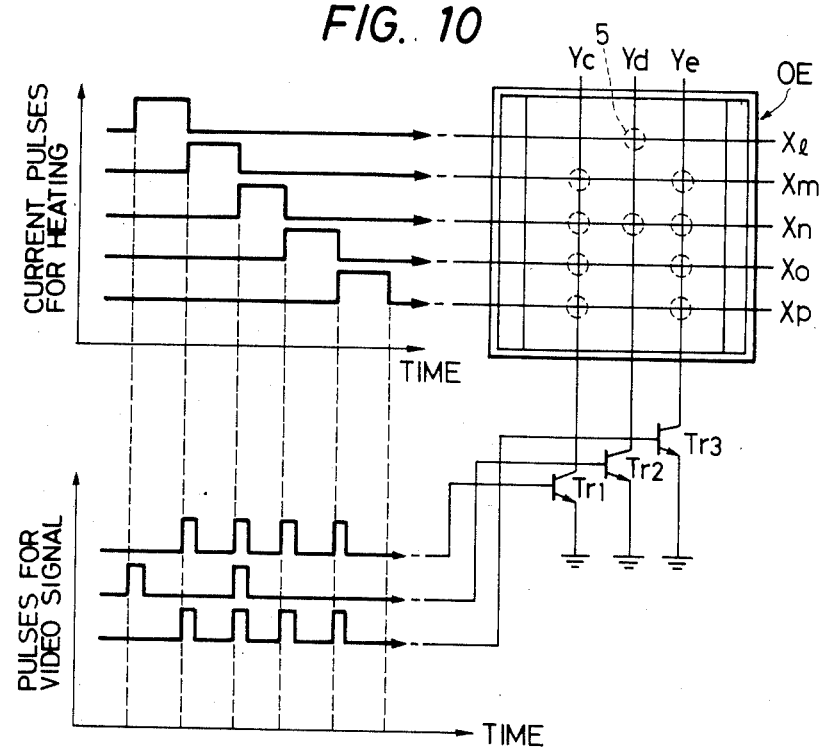
FIG. 10 shows a schematic illustration of the image forming system utilizing the optical modulating method according to the present invention.

Referring next to FIG. 10, an embodiment of matrix driving of such an optical element is to be described in more detail.

In the Figure, OE represents an optical element, having a detailed constitution similar to that as described in FIG. 9. The optical element OE is constituted of heat-generating resistance wires on the line axis of Xl, Xm, Xn, Xo and Xp (these are called as the line wires) and heat-generating resistance wires on the row axis of Yc, Yd and Ye (these are called the row wires), one end of each of the row wires Yc, Yd and Ye is connected to the common direct current source, while the other end is connected to the emitter grounded collector side of the transistors Tr1–Tr3.

When electric current pulses for heating are applied on the line wires Xl, Xm, Xn, Xo and Xp in order, the monomolecular film or the monomolecular layer built-up films (not shown) corresponding to these lines are heated successively in shapes of lines, whereby no heated portion of higher temperature region for heating display is generated in the monomolecular film or the monomolecular layer built-up film, since the extent of heating is set at lower than the threshold value for heating display of the monomolecular film or the monomolecular layer built-up film. On the other hand, predetermined video signals are applied on the row wires Yc, Yd and Ye by applying pulses for video signal on the base side of the emitter grounded transistors Tr1–Tr3 to turn on the transistors Tr1–Tr3 connected to the row wires Yc, Yd and Ye respectively while synchronizing with application of the electric current signals for heating. By application of the video signals, the monomolecular film or the monomolecular layer built-up films corresponding to the row conductive wires Yc, Yd and Ye are heated in shape of lines. This enables additive heating through heat generation at the crossed portions of the line wires and the row wires wherein the electric current pulses for heating and the video signals are synchronized, whereby the extent of heating of the monomolecular film or the monomolecular layer built-up film exceeds the threshold value for heating display to form the heated portion 5 of the monomolecular film or the monomolecular layer built-up film at the crossed portions of the line wires and the row wires selected.

In the above embodiment, when the driving system is changed as shown below, image formation can be effected in entirely the same manner. That is, the effect is the same, even when modified in such a way that the video signals are applied on the line wires and the electric current signals for heating on the row wires. Thus, the optical element OE shown in FIG. 10 enables also a matrix driving. When the monomolecular film or the monomolecular layer built-up film of the optical element OE has a very thin thickness, by providing the heat-generating resistance wires arranged in stripes as described above on both sides of the substrate and the protective substrate, the following effects will be generated:

(1) The manufacturing steps can be simplified to result in improvement of yield;

(2) Heat efficiency is good, since heat is applied on both sides of the monomolecular film or the monomolecular layer built up film; etc.

It is desirable to separately provide a heat releasing plate for enhancing the heat releasing effect of the heat-generating resistance wires. The substrate 1 (FIG. 9) can be utilized as substitute for the heat releasing plate.

The whole body of each of the signal wires are not required to be formed of heat-generating resistors. It is rather preferable to constitute only the crossed portions of the line wires and the row wires of heat-generating resistors, and other portions of good conductors, for the purpose of energy saving, but such a measure involves the drawback of making the manufacturing steps more complicated.

Another embodiment of the heat-generating element for constituting the optical element suitable for the matrix driving as shown in FIG. 10 is described by referring to FIG. 11.

FIG. 11 is a perspective view of the schematic appearance of a partial region of the heat-generating element. In the Figure, 32 shows a heat-generating resistance layer, which can be obtained by forming a known resistor (e.g. nickel-chromium alloy, hafnium boride, tantalum nitride, etc.) into a planar film. Although not shown in the Figure, the resistance layer 32 also extends downwardly of the Figure. All of 33a, 33b, 33c and 33d are row conductive wires, while all of 34a, 34b and 34c are line conductive wires. And, all of these conductive wires are obtained from good conductors such as gold, silver, copper, aluminum, etc. [although not referred to, the conductive wires are generally coated with insulating films of $SiO_2$ (not shown)]. In the heat-generating element shown in the Figure, for example, when the row conductive wire 33b and the line conductive wire 34c are selected and voltage is applied on both of these, current passage occurs at a part of the resistance layer 32 corresponding to the crossed portion 35 of both to effect heat generation.

Thus, any desired crossed (line-row) portion of the line conductive wires and the row conductive wires can be subjected to heat generation. Accordingly, in the optical element in which the heat-generating elements shown in the Figure are assembled in place of the heat-generating elements comprising the heat-generating resistance wires 30, 31 and the insulating layer 29 shown in FIG. 9, display of the dot-matrix image is possible according to the matrix driving system similar to that shown in FIG. 10.

Figure 12:
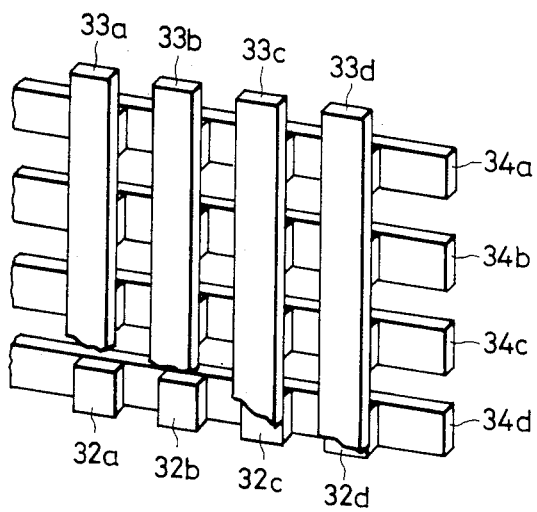

Meanwhile, in the heat-generating element shown in FIG. 11, the heat-generating resistance layer 32 can also be provided only at the crossed portions of the line conductive wires 34 and the row conductive wires 33 (conductive wires being insulated from each other at other portions), and generation of cross talk which is inconvenient to image formation faithful to signals can substantially be prevented in such a constitution (FIG. 12).

In the embodiment in FIG. 11, the line conductive lines 34a, 34b, ... (hereinafter called as the line conductive lines 34) and the row conductive lines 33a, 33b, ... (hereinafter called as the row conductive lines 33) are arranged with intermediary insulating films (not shown) such as of $SiO_2$, $Si_3N_4$, etc., but the insulating films at the crossed regions of the line conductive lines 34 and the row conductive lines 33 are removed, and instead heat-generating resistors 32a, 32b, ... (hereinafter called as heat-generating resistors 32) are embedded therein.

Figure 13:
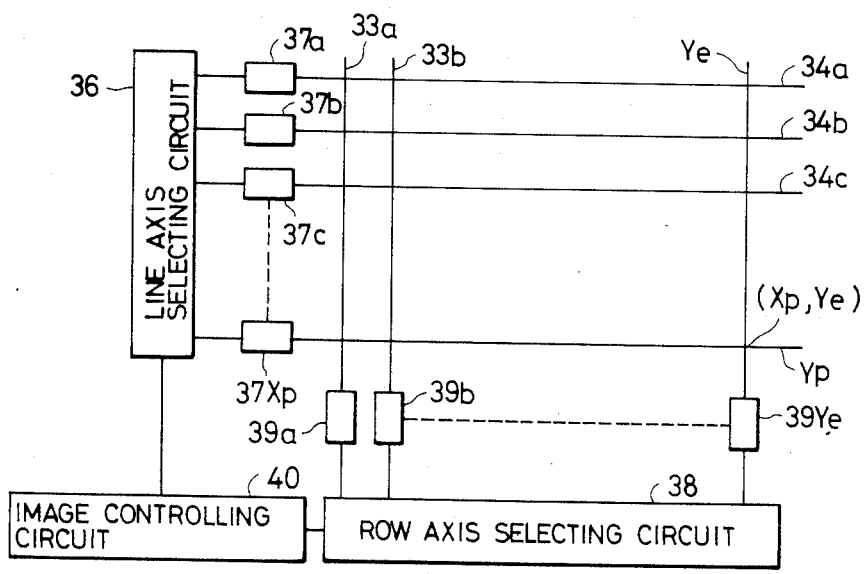
FIG. 13 shows the block diagram of the matrix driving display device.

Next, by referring to FIG. 13, detailed description is given about matrix driving of an embodiment in which the optical element having the heat-generating element as shown in FIG. 12 is assembled in place of the heat-generating element comprising the heat-generating resistance wires 30, 31 and the insulating layer 29 shown in FIG. 9. The line axis selecting circuit 36 is connected electrically through the signal wires to the line axis driving circuits 37a, 37b, ... (hereinafter called as line axis driving circuits 37), and further the respective output terminals of the respective line axis driving circuits 37 are connected to the respective line conductive wires 34. The output terminals and the line conductive wires 34 can be connected in various ways, but for explanation of the basic embodiment in the present specification, description is made about the mode in which there are output terminals in number corresponding to the number of the line conductive lines 34 and one output terminal is connected to one line conductive wire.

The same in the case with respect to the relationship between the row axis selecting circuit 38, the row axis driving circuits 39a, 39b, ... (hereinafter called as the row axis driving circuits 39) and the row conductive wires 33. The image controlling circuit 40 is electrically connected through signal wires to the line axis selecting circuit 36 and the row axis selecting circuit 38. The image controlling circuit 40 commands which line axis the line axis selecting circuit 36 should select by outputting the image controlling signal, and this is the same with respect to the row axis selecting circuit 38. Thus, by the image controlling signal from the image controlling circuit 40, the line axis selecting circuit 36 selects (switch on) a specific line axis (line conductive line) through either one of the line axis driving circuits 37. For example, if the line axis selecting circuit 36 selects the line conductive wire Xp, the Xp selecting signal is generated, which is in turn received by the line axis driving circuit 37 Xp to input the line axis driving signal also into the line conductive wire Xp. On the other hand, when video signal which is one of the image controlling signals from the image controlling circuit 40 is inputted into the row axis selecting circuit 38, the row axis selecting circuit 38 on receiving its command selects the required row axis (row conductive wire). For example, if the row axis selecting circuit 38 selects the row conductive wire Ye, the row axis driving circuit 39Ye receives the Ye row selecting signal from the row axis selecting circuit 38 to make the row conductive line Ye under the state switched on (conducted).

If selection of the line axis is synchronized with selection of the row axis, in the case of this embodiment, the current passes through the heat-generating resistors on the crossed point of the line conductive wire Xp and the row conductive wire Ye (selection point: Xp-Ye) to generate Joule's heat to form a heated portion on the monomolecular film or the monomolecular layer built-up film not shown. Although leak current may pass through the unselected points, it is lower than the current value for forming the heated portion in the monomolecular film or the monomolecular layer built-up film, and therefore no heated portion is formed on the monomolecular film or the monomolecular layer built-up film. The leak current can be made further smaller by imparting the diode function to the heat-generating resistor.

Thus, similarly as described with reference to FIG. 10, also in FIG. 13, two-dimensional image display can be effected by carrying out successive line scanning with the line axis driving signals and outputting the row axis selecting signals synchronized therewith, thereby bringing the row conductive lines 33 selected through the row axis driving circuit 39 to conducted state. In this case, the row axis selecting circuit 38 outputs the row axis selecting signals on receiving the command by a video signal. And, it can be disregarded in which direction the current may flow through the heat-generating resistors. Such line and row axis selecting circuits 36, 38, and the line and row driving circuits 37, 39 can be constituted according to known techniques by use of shift transistors, transistor arrays, etc.

Also, in the display system according to matrix driving utilizing the heat-generating elements as described above, anti-corrosive silicon oxide film or silicon nitride film can be interposed, if desired, between the monomolecular film or the monomolecular layer built-up film 3 and the reflection film or between the monomolecular film or the monomolecular layer built-up film 3 and the heat generating elements (e.g. the heat-generating resistance wire 30 among them) to prevent effectively the reactive corrosion of the monomolecular film or the monomolecular layer built up film with them, also in the case of the optical element OE shown in FIG. 9 similarly as described with reference to FIG. 4(B).

Also, by providing the red filter portion (R), the green filter portion (G) or the blue filter portion (B) of the color mosaic filter as shown in FIG. 8 suitably arranged on the heat-generating portions as the heat-generating element (e.g. the crossed points of heat-generating resistance wires 30 and 31 in the optical element shown in FIG. 9, or the heat-generating resistor 32 in the heat-generating element shown in FIG. 12) so as to correspond thereto, respectively, it is of course possible to effect color display with the displaying elements using the heat-generating elements shown in FIG. 9 and FIG. 12, respectively, according to the same principle as in FIG. 8 by employment of the same constitution as in the embodiment shown in FIG. 8.

Such a matrix driving type optical element is also applicable for the light valve projector as shown in FIG. 5 and FIG. 6. The present invention can also cover an optical element having a monomolecular film or the monomolecular layer built-up film capable of controlling light, electricity, ions, etc. through combination with functional molecules such as photo-sensitive molecules, strongly dielectric substances, complexes, etc. and surface active substances.

Figure 14:
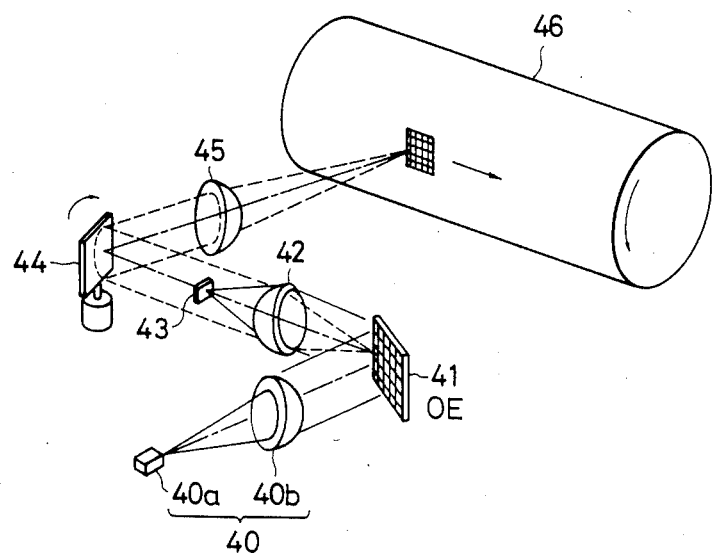
FIG. 14 and FIG. 15 show embodiments of the optical modulating device according to the present invention.

FIG. 14 shows an embodiment of the optical modulating device of the present invention. The optical element 41 capable of generating a refractive index distribution with a two-dimensional pattern is irradiated with a light flux from the light flux generating means 40 comprising the light source 40a and the collimater lens 40b. The light flux not diverged by the refractive index distribution is focused by the lens 42 and shielded by the shielding filter 43 provided on the focusing surface of the lens 42. Since the light flux scattering position of the above optical element is located so as to be substantially coincident with the other focusing surface of the lens 42, the light flux diverged from the optical element 41 becomes substantially parallel light flux through the lens 42 to form images on the light-sensitive medium surface 46 through the lens 45, thereby forming a two dimensional image corresponding to the generation pattern of the refractive index distribution.

In the above diverged light flux is made deflectable by arranging a deflecting mirror 44 between the lens 42 and the lens 45, a scanning image of the above two dimensional image can be obtained on the light-sensitive surface 46. For example, if a system is designed so as to form various kinds of letter patterns utilizing the refractive index distributions by the optical element generating two-dimensional refractive index distributions, as described above, a printer terminal machine such as of a word processer can be realized. Rotation of the above deflecting mirror should desirably be intermittent rotation, because the refractive index distribution does not occur on the whole surface at the same time by the optical element 41.

Of course, in the optical element capable of forming two dimensional patterns, a transition type optical element as shown in FIG. 9(A) can also be obtained.

Figure 15:
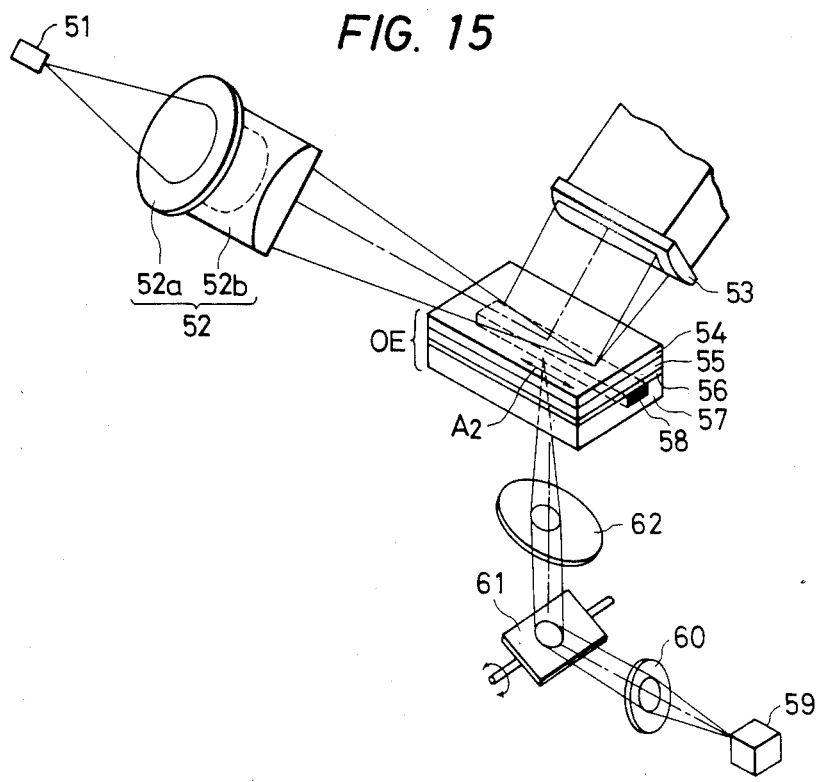

In the above embodiment, description has been made about formation of refractive index distribution with the use of heat-generating resistors, but it can also be obtained by scanning the light beam and converting the scanned beam to heat. FIG. 15 shows an embodiment of forming a refractive index distribution by scanning the light beam, in which the optical element OE is formed of a transparent protective plate 54, a monomolecular film or monomolecular layer built-up film 55, a thermally conductive insulating layer 56 and a transparent support 57, which support 57 is provided with a heat absorbing layer 58. 59 is a semiconductor laser capable of self-modulation, and the light flux from the laser 59 is converted to a parallel beam through a collimater lens 60 to form an image through a galvanomirror 61 on the aforesaid heat absorbing layer 58 by a focusing lens 62 for scanning. The heat absorbing layer 58 is constituted of a material which can absorb particularly well the light flux with the wavelength from the semiconductor laser 59, and therefore the light flux passed through the light absorbing layer 58 becomes substantially zero. When the above galvanomirror 61 is rotated around the rotating axis, the scanning optical system is set so that the light beam spot may be moved in the direction of the arrowhead $A_2$ along the absorbing layer 58. And, in the region of the absorbing layer 58 where a beam spot with the above semiconductor laser 59 are formed, the light beam is converted to heat to form a refractive index distribution through an insulating layer 56 in the monomolecular film or the monomolecular layer built-up film. Therefore, by turning on or off the beam emitted from the semiconductor laser with accompaniment of rotation of the galvanomirror 61, the refractive index distribution can be formed at a desired position. For the optical system for projecting the light flux diverged by the refractive index distribution and leading the diverged light to the light-receiving medium, all the reflection type optical systems as described above are of course available, and therefore description thereof is omitted here.

It is also possible to obtain an optical modulating device according to refractive index distribution having a two-dimensional pattern by providing the aforesaid heat absorbing layer 58 on the whole surface and making the scanning optical system for irradiating light beam on said absorbing layer a two-dimensional scanning optical system.

The principal effects of the present invention may b summarized as follows.

(1) Image display of high resolution is possible, because one heated portion of minute monomolecular film or the monomolecular layer built-up film can be arranged as the display image element unit at high density.

(2) By controlling the existence time of the heated portion of the monomolecular film or the monomolecular layer built-up film as the display image element, display of stationary picture or moving picture including slow motion can easily be done.

(3) Multi-color display and full color display can easily be practiced.

(4) Due to relatively simple structure of the element, it is excellent in productivity, and the element is high in durability and excellent in reliability.

(5) The element is applicable for a wide scope of driving systems.

(6) Since the monomolecular film or the monomolecular layer built-up film can be prepared by use of the Langmuir-Blodgett method, the element can easily be made to have a large area.

(7) Since no liquid such as liquid crystal is employed, preparation can easily and safely be done.

(8) The optical element utilizing the optical modulating method according to the present invention is not limited to application for display devices, but it is also applicable for optical modulating devices to be used for electrophotography, etc.

(9) Because of the phase transition temperature which is not so high, the electric power to be used for the optical element can be small, and, corresponding thereto, the power source portion, namely the optical modulating device and the display device can be miniatuarized.

(10) In the case of utilizing the phase transition of the monomolecular film or the monomolecular layer built-up film, the phase transition state can be maintained for a long time depending on the structure of the constituent molecules of the built-up film. In such a case, the optical element according to the present invention can be utilized for recording devices (materials) and memory devices (materials).

The present invention is described in more detail by referring to the following Examples.

EXAMPLE 1

An optical element was prepared as described below.

On the surface of a 50 mm square glass substrate, Gd-Tb-Fe gadolinium-terbium-iron) layer with a layer thickness of 1500 Å was attached according to the sputtering method to form a radiation absorbing layer 9 thereon. For prevention of oxidation of the Gd-Tb-Fe layer, it was coated with a protective film of $SiO_2$ thereon.

Next, after the above substrate was washed thoroughly, it was dipped in an aqueous phase containing $4 \times 10^{-4}$ of $CdCl_2$ in a LB-film preparing device (Trough-4) produced by Joyce Loebl Co. Then, 0.1 ml of chloroform solution containing $5 \times 10^{-3}$ mol of arachidic acid was added into the aqueous phase by means of a syringe. After evaporation of chloroform, the arachidic acid monomolecular layer was controlled to have a surface pressure of 30 dyne/cm, and a Y-type built-up film was formed to a film thickness of 5 to 10 μm by attachment on the surface of $SiO_2$ layer by repeating withdrawing and dipping at a speed of 1 cm/min, and the built-up film was covered with a glass substrate as the protective substrate 4. Further, at a position close to or nearby the outer surface of the glass substrate 4, a lattice shaped in lines of 5 lines/mm was provided.

As the radiation heat source, a semiconductor laser emitting the light with a wavelength of 830 nm was employed. Arachidic acid was heated by irradiation of the semiconductor laser, and it was confirmed that the wave front of the incident light flux passed therethrough received deformation to give an optical modulation effect.

EXAMPLE 2

An optical element was prepared as described below.

A glass substrate of 50 mm square was attached on its surface with indium tin oxide (I.T.0.) with a film thickness of 1500 Å according to the sputtering method. Next, according to the photoetching method, a pattern of lines with 10 lines/mm was formed to obtain transparent heat-generating resistance wires 31. As the etching solution for I.T.0., a mixture of an aqueous ferric chloride solution and hydrochloric acid was employed. Subsequently, on the glass substrate surface having the transparent heat-generating resistance wires 31 provided thereon, $SiO_2$ film with a thickness of 2000 Å A was attached according to the sputtering method to form an insulating layer 29. Further, I.T.0. film with a film thickness of 1500 Å s formed on the $SiO_2$ film, followed by formation of transparent heat-generating resistance wires 30 according to the photoetching method so as to cross perpendicularly the above transparent heat-generating resistance wires 31.

As the next step, a built-up film of stearic acid was formed to a film thickness of 5 to 10 μm on the above substrate, following the same conditions and the steps as described in Example 1, and the built-up film was covered with a glass substrate 4.

As the radiation heat source, a semiconductor laser emitting the light with a wavelength of 830 nm was employed.

It was confirmed that the optical element obtained had a certain optical modulating effect when driven in combination of an appropriate Schlieren optical system. That is, by irradiation of the semiconductor laser, the stearic acid layer was heated at certain positions and the wave front of the incident light passing therethrough was found to be deformed.

EXAMPLE 3

An optical element was prepared as described below.

On the surface of a 50 mm square glass substrate, Gd-Tb-Fe (gadolinium-terbium-iron) layer with a layer thickness of 1500 Å A was attached according to the sputtering method to form a radiation absorbing layer 9 thereon. For prevention of oxidation of the Gd-Tb-Fe layer, it was coated with a protective film of $SiO_2$ thereon. Next, on the water surface of a LB-film preparing device, a monomolecular film of cadmium arachidate was formed, and a Y-type built-up film was formed to a film thickness of 10 μm by attachment on the surface of the $SiO_2$ film according to the vertical dipping method, and the built-up film was covered with a glass substrate as the protective substarte 4. Further, at a position close to or nearby the outer surface of the glass substrate 4, a lattice shaped in lines of 5 lines/mm was provided.

As the radiation heat source, a semiconductor laser emitting the light with a wavelength of 830 nm was employed. When driven under an appropriate transmitting illumination, it was confirmed to have a certain display effect.

EXAMPLE 4

An optical element was prepared as described below.

A glass substrate of 50 mm square was attached on its surface with indium tin oxide (I.T.0.) with a film thickness of 1500 Å according to the sputtering method. Next, according to the photoetching method, a pattern of lines with 10 lines/mm was formed to obtain transparent heat-generating resistance wires 31. As the etching solution for I.T.0., a mixture of an aqueous ferric chloride solution and hydrochloric acid was employed. Subsequently, on the glass substrate surface having the transparent heat-generating resistance wires 31 provided thereon, SiO$_2$ film with a thickness of 2000 Å was attached according to the sputtering method to form an insulating layer 29. Further, I.T.0. with a film thickness of 1500 Å was attached on the SiO$_2$ film, followed by formation of transparent heat-generating resistance wires 30 according to the photoetching method so as to cross perpendicularly the above transparent heat-generating resistance wires 31. Next, on the water surface of a LB-film preparing device, a monomolecular film of cadmium arachidate was formed, and a Y-type built-up film was formed to a film thickness of 10 μm by attachment on the surface of the SiO$_2$ film according to the vertical dipping method, and the built-up film was covered with a glass substrate as the protective substrate 4. When actuated under the transmissive illumination optical system as mentioned above, a certain display effect could be obtained.

EXAMPLE 5

An optical element was prepared as described below.

On the surface of a 50 mm square glass substrate, Gd-Tb-Fe (gadolinium-terbium-iron) layer with a layer thickness of 1500 Å was attached according to the sputtering method to form a radiation absorbing layer 9 thereon. For prevention of oxidation of the Gd-Tb-Fe layer, it was coated with a protective film of SiO$_2$ thereon.

Next, after the above substrate was washed thoroughly, it was dipped in an aqueous phase of a LB-film preparing device (Trough-4) produced by Joyce Loebl Co. Then, 0.1 ml of chloroform solution containing $5 \times 10^{-3}$ mol of distearyldimethylammonium bromide was added into the aqueous phase by means of a syringe. After evaporation of chloroform, the distearlyldimethylammonium bromide monomolecular layer was controlled to have a surface pressure of 30 dyne/cm, and a Y-type built-up film was formed to a film thickness of 5 to 10 μm by attachment on the surface of SiO$_2$ by repeating withdrawing and dipping at a speed of 1 cm/min, and the built-up film was covered with a glass substrate as the protective substrate 4. Further, at a position close to or nearby the outer surface of the glass substrate, a lattice shaped in lines of 5 lines/mm was provided.

As the radiation heat source, a semiconductor laser emitting the light with a wavelength of 830 nm was employed. Distearydimethylammonium bromide layer was heated by irradiation of the semiconductor laser to 60° C or above, whereby phase transition occurred to cause scattering and thus the display effect could be confirmed.

EXAMPLE 6

An optical element was prepared as described below A glass substrate of 50 mm square was attached on its surface with indium tin oxide (I.T.0.) with a film thickness of 1500 Å according to the sputtering method. Next, according to the photoetching method, a pattern of lines with 10 lines/mm was formed to obtain transparent heat-generating resistance wires 31. As the etching solution for I.T.0., a mixture of an aqueous ferric chloride solution and hydrochloric acid was employed. Subsequently, on the glass substrate surface having the transparent heat-generating resistance wires 31 provided thereon, SiO$_2$ film with a thickness of 2000 Å was formed according to the sputtering method to form an insulating layer 29. Further, I.T.0. with a film thickness of 1500 Å as attached on the SiO$_2$ film, followed by formation of transparent heat-generating resistance wires 30 according to the photoetching method so as to cross perpendicularly the above transparent heat-generating resistance wires 31.

As the next step, a built-up film of distearyldimethylammonium bromide was formed to a film thickness of 5 to 10 μm on the above substrate, following the same conditions and the steps as described in Example 1, and the built-up film was covered with a glass substrate 4.

As the radiation heat source, a semiconductor laser emitting the light with a wavelength of 830 nm was employed.

It was confirmed that the optical element obtained had a certain optical modulating effect when driven in combination of an appropriate Schlieren optical system. That is, by irradiation of the semiconductor laser, when the distearyldimethylammonium bromide layer was heated at certain positions to 60° C. or highter, phase transition occured to cause light scattering.

EXAMPLE 7

A color optical element having a radiation absorbing layer as the heat-generating element was prepared as described below.

On the surface of a 50 mm square glass substrate, Gd-Tb-Fe (gadolinium-terbium-iron) layer with a layer thickness of 1500 Å was attached according to the sputtering method to form a radiation absorbing layer 9 thereon. For prevention of oxidation of the Gd-Tb-Fe layer, it was coated with a protective film of SiO$_2$ *thereon.*

As the color separation filter, the mosaic filter having red coloration region (R), green coloration region (G) and blue coloration region (B), respectively, was prepared according to the method as described below. Arrangement according to the Bayer system was employed, and the size of one mosaic was made 50 μm square.

As the polymeric substance to be used for the respective coloration polymer layers, a solvent-soluble type polyester resin (Byron-200, produced by Toyobo Co., Ltd.). As the colorants, Sumikalon Red S-GG (produced by Sumitomo Chemical Co., Ltd.) was used for red colorant, Cibaset Green 5G (produced by Ciba-Geigy Co., Ltd.) for green colorant and Miketone Fast Blue Extra (produced by Mitsui Toatsu Chemicals, Inc.) for blue colorant.

First, a mother liquor of the coloration polymer was prepared by dissolving homogeneously Byron-200 (40 parts), nitrocellulose (10 parts) and methyl ethyl ketone (80 parts).

The above mother liquor (50 cc) was mixed thoroughly (for about 2 hours) with 1 mg of the above red colorant in a stainless steel ball mill to prepare a red colored polymer. Similarly, green colored polymer and blue colored polymer were also prepared.

Subsequently, the red colored polymer was applied on a glass plate by means of a spinner (1H-5 Model, produced by Mikasa Co., Ltd.) to a uniform coating with a thickness of 0.8 μm. After the coating was hardened sufficiently, a photoresist OMR-81 (produced by Tokyo Oka Co., Ltd.) for the etching mask was applied also by means of the spinner. Then, the coated product was exposed to light with a patterning mask and developed to form an etching mask.

As the next step, unnecessary portions (non-masked portions) were removed by ashing etching by a plasma etching device ("PSASMOD" produced by Tegal corp.) through which oxygen gas was flowed to obtain a red filter element. Similarly, each of the green colored and blue colored polymers was subjected successively to coating by a spinner, preparation of an etching mask with a photoresist and plasma etching, whereby green filter element and blue filter element having respective desired patterns were provided on the above glass substrate. As the result, a tri-color mosaic filter comprising red, green and blue colored regions with desired patterns was prepared.

Next, cadmium arachidate monomolecular layer film was formed on the water surface of a LB-film preparing device, and a Y-type built-up film with a film thickness of 10 μm was formed on the surface of the $SiO_2$ film according to the vertical dipping method, and the built-up film was covered with a glass substrate as the protective substrate 1.

As the radiation heat source, a semiconductor laser emitting the light with a wavelength of 830 nm was used. It was confirmed that the optical element obtained had a certain display effect when actuated in combination with an appropriate schlieren optical system.

We claim:

1. An optical modulation device comprising (a) a substrate, (b) a Langmuir-Blodgett built-up film of a plurality of monomolecular layers each comprising a long chain dialkylammonium salt compound having at least a long chain alkyl hydrophobic moiety and an ammonium hydrophilic moiety, said plurality of monomolecular layers having an interface between adjacent monomolecular layers wherein alternately the ammonium hydrophilic moieties of the long chain dialkylammonium salt compound molecules in adjacent monomolecular layers face each other, and the long chain alkyl hydrophobic moieties of the long chain dialkylammonium salt compound molecules in adjacent monomolecular layers face each other at said interfaces; and the ammonium hydrophilic moieties of the long chain dialkylammonium salt compound molecules face the substrate in the monomolecular later adjacent the substrate, and (c) a heat-generating element for changing a refractive index of said film.

2. An optical modulation device according to claim I, wherein said heat-generating element is in contact with or in the vicinity of said Langmuir-Blodgett built-up film.

3. An optical modulating device according to claim 1, wherein said heat-generating element comprises a radiation absorbing layer.

4. An optical modulating device according to claim 1, wherein said heat-generating element comprises a heat-generating resistive member.

5. An optical modulating device according to claim 1, further provided with a colored filter layer.

6. An optical modulating device according to claim 5, wherein said filter layer comprises an assembly of a plurality of divided different color portions.

7. An optical modulating device comprising (a) a substrate, (b) a Langmuir-Blodgett built-up film of a plurality of monomolecular layers each comprising a long chain dialkylammonium salt compound having at least a long chain alkyl hydrophobic moiety and an ammonium hydrophilic moiety, said plurality of monomolecular layers having an interface between adjacent monomolecular layers wherein alternately the ammonium hydrophilic moieties of the long chain dialkylammonium salt compound molecules in adjacent monomolecular layers face each other, and the long chain alkyl hydrophobic moieties of the long chain dialkylammonium salt compound molecules in adjacent monomolecular layers face each other at said interfaces; and the ammonium hydrophilic moieties of the long chain dialkylammonium salt compound molecules face the substrate in the monomolecular layer adjacent the substrate, (c) a heat-generating element for changing a refractive index of said film, and (d) a driving means for driving said heat-generating element.

8. An optical modulating device according to claim 7, further comprising a signal outputting means for outputting signals corresponding to image informations to said optical element.

9. An optical modulating device according to claim 8, further comprising an illuminating optical system for illumination of said optical element.

10. An optical modulating device according to claim 9, wherein said illuminating optical system comprises a Schlieren optical system.

11. An optical modulating device according to claim 9, further comprising an image formation optical system.

12. An optical modulating method comprising heating a Langmuir-Blodgett built-up film having a refractive index distribution with a means for generating heat in correspondence to input signals to change said refractive index distribution; said Langmuir-Blodgett built-up film comprising a plurality of monomolecular layers each comprising a long chain dialkylammonium salt compound having at least a long chain alkyl hydrophobic moiety and an ammonium hydrophilic moiety, said plurality of monomolecular layers having an interface between adjacent monomolecular layers wherein alternately the ammonium hydrophilic moieties of the long chain dialkylammonium salt compound molecules in adjacent monomolecular layers face each other, and the long chain alkyl hydrophobic moieties of the long chain dialkylammonium salt compound molecules in adjacent monomolecular layers face other at said interfaces; and the ammonium hydrophilic moieties of the long chain dialkylammonium salt compound molecules face the substrate in the monomolecular layer adjacent the substrate.

13. An optical modulating method comprising passing light through a Langmuir-Blodgett built-up film having optical physical properties, and heating a portion of said Langmuir-Blodgett built-up film with a means for generating heat in correspondence to input signals to cause change in the optical physical properties of said portion whereby light passing through said portion scatters or changes its optical path; said Langmuir-Blodgett built-up film comprising a plurality of monomolecular layers each comprising a long chain dialkylammonium salt compound having at least a long chain alkyl hydrophobic moiety and an ammonium hydrophilic moiety, said plurality of monomolecular layers having an interface between adjacent monomolecular layers wherein alternately the ammonium hydrophilic moieties of the long chain dialkylammonium salt compound molecules in adjacent monomolecular layers face each other, and the long chain alkyl hydrophobic moieties of the long chain dialkylammonium salt compound molecules in adjacent monomolecular layers face other at said interfaces; and the ammonium hydrophilic moieties of the compound molecules face the substrate in the monomolecular layer adjacent the substrate.

* * * * *